(12) United States Patent
Chuang

(10) Patent No.: US 8,950,717 B2
(45) Date of Patent: Feb. 10, 2015

(54) SUPPORTING DEVICE

(71) Applicant: Cheng Uei Precision Industry Co., Ltd., New Taipei (TW)

(72) Inventor: Yung Cheng Chuang, New Taipei (TW)

(73) Assignee: Cheng Uei Precision Industry Co., Ltd., New Taipei (TT)

( * ) Notice: Subject to any disclaimer, the term of this patent is extended or adjusted under 35 U.S.C. 154(b) by 70 days.

(21) Appl. No.: 13/905,087

(22) Filed: May 29, 2013

(65) Prior Publication Data

US 2014/0353447 A1    Dec. 4, 2014

(51) Int. Cl.
 *A47B 5/06*     (2006.01)
 *F16M 13/02*    (2006.01)

(52) U.S. Cl.
 CPC .................................. *F16M 13/02* (2013.01)
 USPC ............... 248/231.41; 248/309.1; 248/316.4; 379/454; 379/455; 379/446

(58) Field of Classification Search
 USPC .................. 248/274.1, 309.1, 316.4, 231.41, 248/229.12, 229.22; 379/454, 426, 446, 379/455; 343/878; 455/90.1
 See application file for complete search history.

(56) References Cited

U.S. PATENT DOCUMENTS

| | | | | |
|---|---|---|---|---|
| 5,457,745 A * | 10/1995 | Wang | | 379/454 |
| 5,903,645 A * | 5/1999 | Tsay | | 379/455 |
| 5,982,885 A * | 11/1999 | Ho | | 379/446 |
| 6,570,992 B1 * | 5/2003 | Folan et al. | | 381/365 |
| 7,017,243 B2 * | 3/2006 | Carnevali | | 24/523 |
| 7,158,092 B2 * | 1/2007 | Shen | | 343/878 |
| 8,240,628 B2 * | 8/2012 | Huang | | 248/316.1 |
| 8,376,301 B2 * | 2/2013 | Fan | | 248/316.4 |
| 8,638,557 B2 * | 1/2014 | Tsai | | 361/679.56 |
| 8,711,553 B2 * | 4/2014 | Trinh et al. | | 361/679.02 |
| 8,770,539 B1 * | 7/2014 | Hsu | | 248/688 |
| 2008/0203260 A1 * | 8/2008 | Carnevali | | 248/316.5 |
| 2011/0062299 A1 * | 3/2011 | Tsai | | 248/231.41 |
| 2012/0104195 A1 * | 5/2012 | Da Costa Pito et al. | ... | 248/205.1 |
| 2012/0257346 A1 * | 10/2012 | Hulet | | 361/679.32 |
| 2014/0097306 A1 * | 4/2014 | Hale et al. | | 248/122.1 |
| 2014/0263931 A1 * | 9/2014 | Chen | | 248/576 |

* cited by examiner

*Primary Examiner* — Anita M King
(74) *Attorney, Agent, or Firm* — Cheng-Ju Chiang

(57) ABSTRACT

A supporting device includes a holding module and a locating module. The holding module includes a rear shell and a front shell which have a bottom positioning shell and a top positioning shell covered to define a receiving chamber therebetween. The locating module is movably disposed in the receiving chamber and includes a supporting part, a slide part mounted on the supporting part and slidable forward and backward, a locating part fixed on the slide part and projecting out of the top positioning shell, and an elastic part clamped between the supporting part and the bottom positioning shell. The locating part is located in front of the front shell with a distance therebetween being adjustable by the locating part along with the slide part sliding forward and backward. The supporting part together with the slide part and the locating part can move upward and downward by the elastic part.

6 Claims, 5 Drawing Sheets

SUPPORTING DEVICE

BACKGROUND OF THE INVENTION

1. Field of the Invention

The present invention relates to a supporting device, and more particularly to an adjustable supporting device.

2. The Related Art

Nowadays, along with the progress and development of the society, all kinds of convenient devices are produced to meet different needs for people in daily life. And it is the trend that the convenient devices have functions thereof in the diversified development.

A supporting device serving for mobile phones and satellite navigators is being used more and more widely in a car. Generally, the supporting device includes a holding module and a locating module fixed on the holding module. The holding module is used to hold external products, such as the mobile phones and the satellite navigators. The external product defines a locating hole corresponding to the locating module. After the external product is held in the holding module, the locating module is inserted in the locating hole to firmly position the external product in the supporting device.

However, the above-mentioned supporting device has the locating module immovably fixed on the holding module. When the external products have different height and thicknesses, the supporting device cannot serve for the forgoing external products. As a result, the supporting device cannot satisfy various demands of customers. So a supporting device capable of being adjusted according to the external products is required.

SUMMARY OF THE INVENTION

It is an object of the present invention to provide a supporting device which includes a holding module and a locating module. The holding module includes a rear shell and a front shell covered on the rear shell. A bottom end of the rear shell extends to form a bottom positioning shell projecting in front of the rear shell. A bottom end of the front shell extends to form a top positioning shell projecting in front of the front shell. The top positioning shell and the bottom positioning shell are matched with and covered with each other to define a receiving chamber therebetween. The locating module is movably disposed in the receiving chamber of the holding module. The locating module includes a supporting part, a slide part mounted on the supporting part and capable of sliding forward and backward with respect to the supporting part, a locating part fixed on the slide part and projecting upward out of the top positioning shell, and an elastic part elastically clamped between the supporting part and the bottom positioning shell. The locating part is apart located in front of the front shell. A distance between the locating part and the front shell can be adjusted by the locating part along with the slide part sliding forward and backward with respect to the front shell. The supporting part together with the slide part and the locating part can move upward and downward with respect to the front shell by virtue of the elastic part.

As described above, the supporting device in this invention can hold different thicknesses of external products thereon by adjusting the distance between the locating part and the front shell because the locating part along with the slide part can slide forward and backward with respect to the front shell. Furthermore, the supporting part together with the slide part and the locating part can move upward and downward with respect to the front shell by virtue of the elastic part, so that makes the supporting device capable of holding different height of external products thereon. So the supporting device in this invention can satisfy the various demands of customers.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
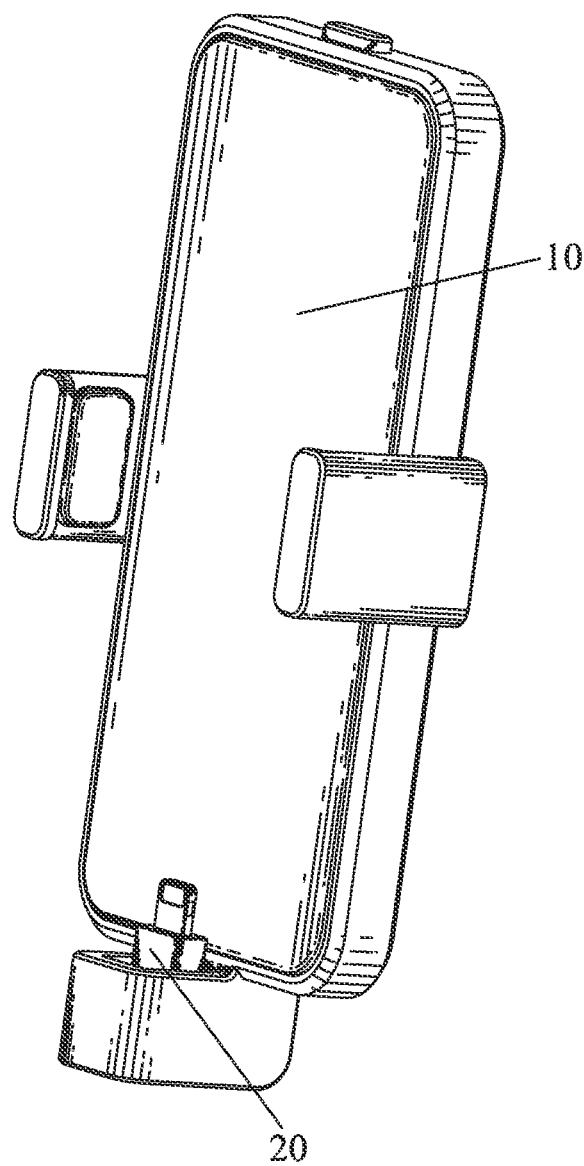
FIG. 1 is an assembled perspective view of a supporting device in accordance with an embodiment of the present invention.
Figure 2:
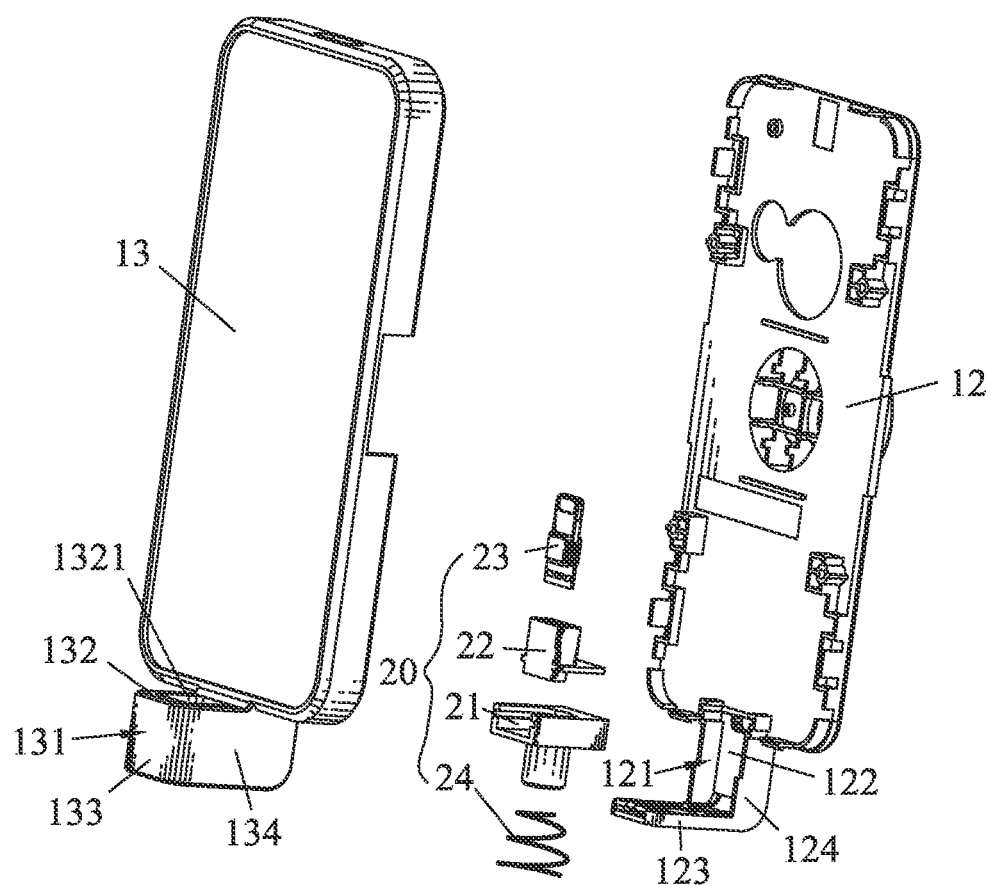
FIG. 2 is an exploded perspective view of the supporting device of FIG. 1.
Figure 3:
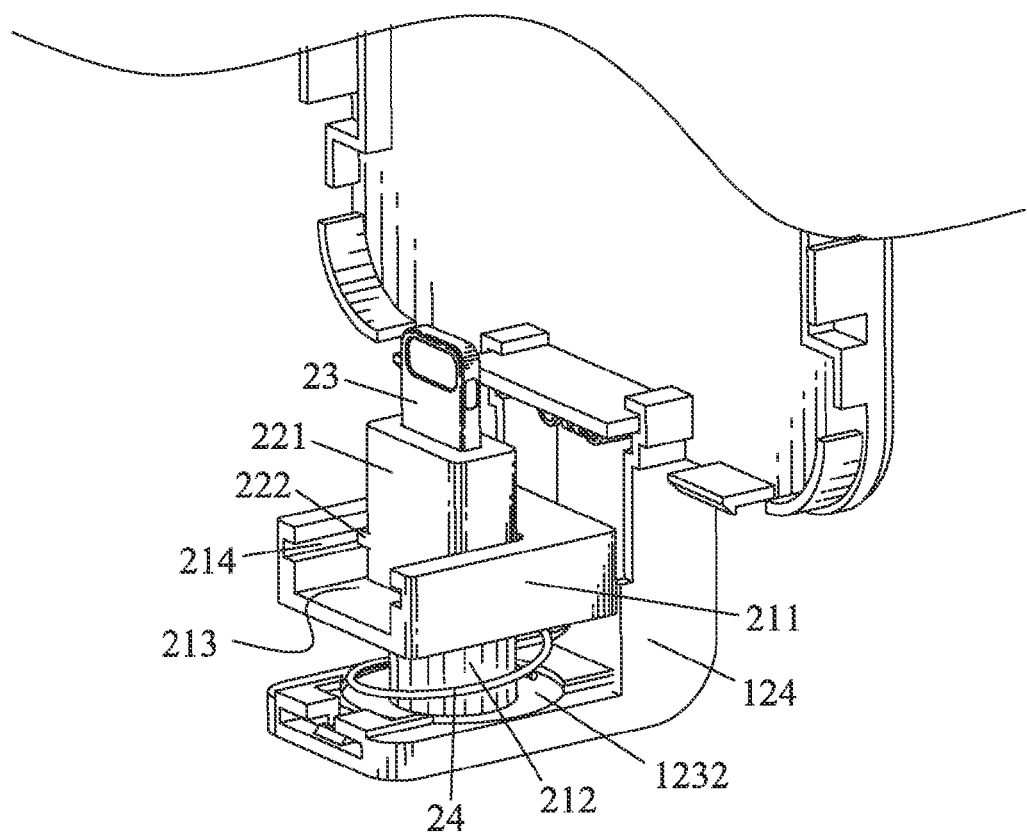
FIG. 3 is an assembled perspective view of a rear shell and a locating module of the supporting device of FIG. 2.
Figure 4:
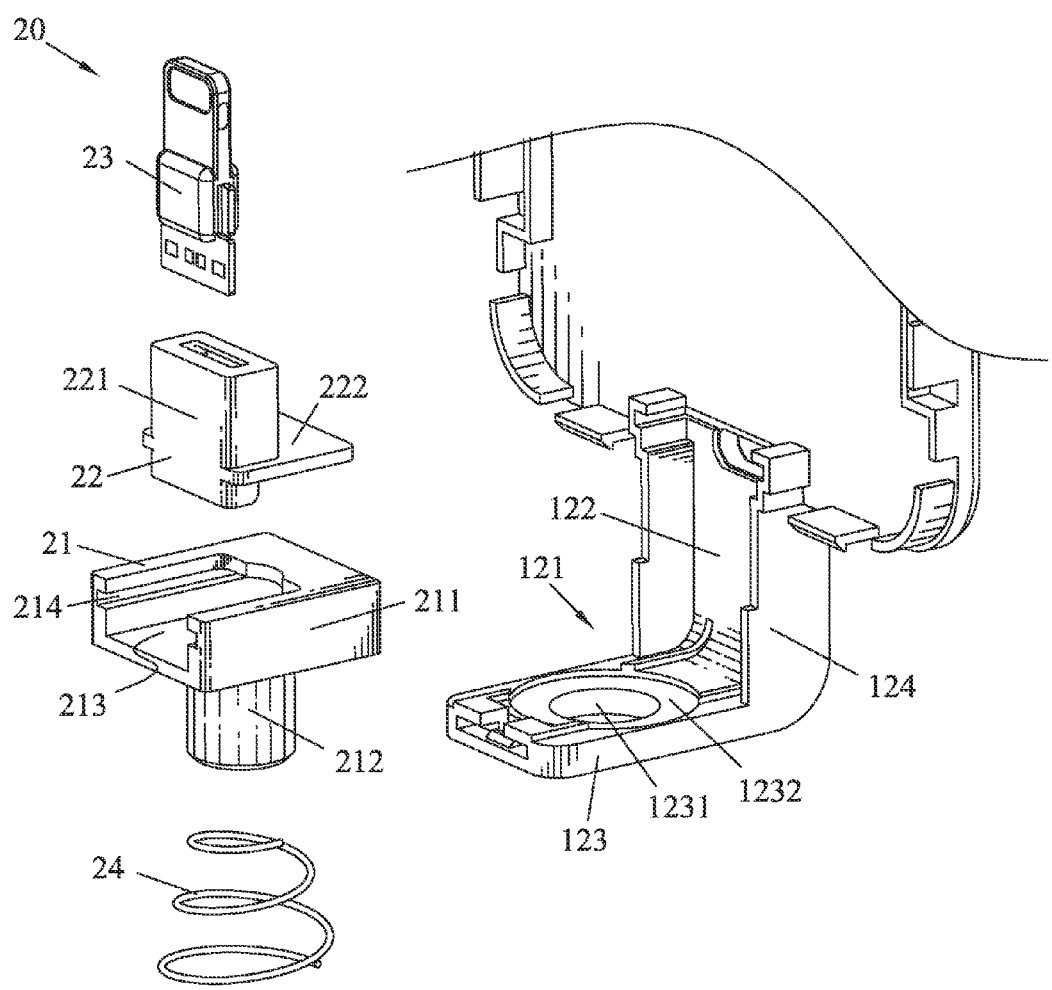
FIG. 4 is an exploded perspective view of the rear shell and the locating module of FIG. 3.
Figure 5:
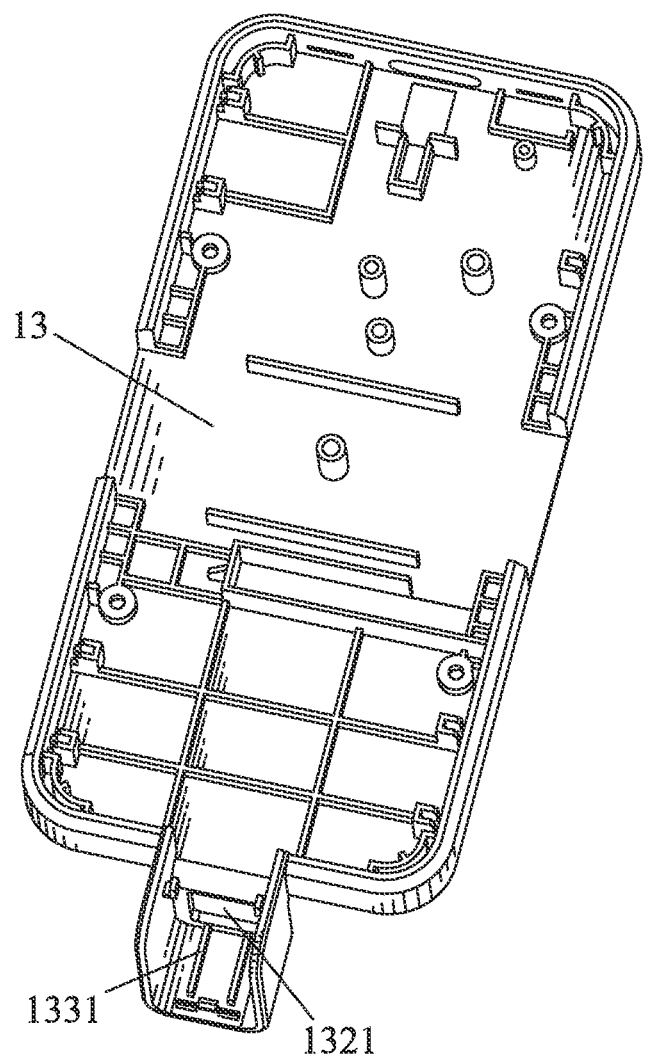
FIG. 5 is a perspective view of a front shell of the supporting device of FIG. 2.

Referring to FIGS. 1-5, a supporting device 100 according to an embodiment of the present invention includes a holding module 10 and a locating module 20.

The holding module 10 includes a rear shell 12 and a front shell 13 covered on the rear shell 12. A bottom end of the rear shell 12 extends to form a bottom positioning shell 121 projecting in front of the rear shell 12. A bottom end of the front shell 13 extends to form a top positioning shell 131 projecting in front of the front shell 13. The top positioning shell 131 and the bottom positioning shell 121 are matched with and covered with each other to define a receiving chamber (not labeled) therebetween.

The locating module 20 is movably disposed in the receiving chamber of the holding module 10. The locating module 20 includes a supporting part 21, a slide part 22 mounted on the supporting part 21 and capable of sliding forward and backward with respect to the supporting part 21, a locating part 23 fixed on the slide part 22 and projecting upward out of the top positioning shell 131, and an elastic part 24 elastically clamped between the supporting part 21 and the bottom positioning shell 121. The locating part 23 is apart located in front of the front shell 13. A distance between the locating part 23 and the front shell 13 can be adjusted by the locating part 23 along with the slide part 22 sliding forward and backward with respect to the front shell 13. The supporting part 21 together with the slide part 22 and the locating part 23 can move upward and downward with respect to the front shell 13 by virtue of the elastic part 24.

The supporting part 21 has a base body 211. A receiving cavity 213 is opened in the base body 211 and has a front end and a top end open freely. Two opposite inner sidewalls of the receiving cavity 213 are oppositely concaved inward to form a pair of slide slots 214 each extending along a front-to-rear direction and penetrating through a front face of the base body 211. The slide part 22 has a locating body 221 and a slide board 222 protruding sideward and extending rearward from two opposite side faces of a lower portion of the locating body 221. The lower portion of the locating body 221 is disposed in the receiving cavity 213 and the slide board 222 is slidably positioned in the slide slots 214 to guide the slide part 22 to slide forward and rearward. An upper portion of the locating body 221 projects upward out of the receiving cavity 213. The locating part 23 is vertically fixed in the locating body 221 of the slide part 22.

The bottom positioning shell 121 has a rear plate 122 extending downward from a bottom edge of the rear shell 12, a bottom plate 123 bent and extending forward from a bottom edge of the rear plate 122, and two side plates 124 extending forward from two opposite side edges of the rear plate 122. A through hole 1231 is vertically opened in the bottom plate 123. A top face of the bottom plate 123 is concaved downward to form a ring-shaped positioning groove 1232 coaxial around and communicated with the through hole 1231. A bottom face of the base body 211 of the supporting part 21 protrudes downward to form a pillar 212 vertically movably inserted in the through hole 1231. The elastic part 24 is sleeved round the pillar 212 with one end thereof abutting against the bottom face of the base body 211 and the other end thereof being positioned in the positioning groove 1232. In this embodiment, the elastic part 24 is a spring.

The top positioning shell 131 has a top plate 132 extending forward from a bottom edge of the front shell 13, a front plate 133 extending downward from a front edge of the top plate 132, and two lateral plates 134 extending downward from two opposite side edges of the top plate 132 and connected with two opposite side edges of the front plate 133 and the bottom edge of the front shell 13. A through aperture 1321 is vertically opened in the top plate 132 through which the locating part 23 movably passes. An inner side of the front plate 133 protrudes rearward to form a plurality of vertical blocking ribs 1331. The base body 211 of the supporting part 21 has a rear face thereof abutting against front edges of the side plates 124 of the bottom positioning shell 121 and the front face thereof abutting against the blocking ribs 1331 of the top positioning shell 131.

In use, when an external product will be held in the supporting device 100, the external product presses downward the locating module 20 until the locating part 23 is inserted in the external product to firmly hold the external product in the supporting device 100 and against the front shell 13. In the process of the locating part 23 being pressed downward and driving the slide part 22 and the supporting part 21 to move downward, the pillar 212 passes through the through hole 1231 to project out of the bottom positioning shell 121. At this moment, the elastic part 24 is elastically compressed by the base body 211 of the supporting part 21. When different thicknesses of external products will be held in the supporting device 100, the slide part 22 together with the locating part 23 moves forward or rearward with respect to the front shell 13 under the cooperation guidance of the slide board 222 and the slide slots 214 so as to adjust the distance between the locating part 23 and the front shell 13. When the external product is demounted from the supporting device 100, the elastic part 24 pushes the supporting part 21 upward to home by virtue of the release of elasticity thereof.

As described above, the supporting device 100 in this invention can hold the different thicknesses of external products thereon by adjusting the distance between the locating part 23 and the front shell 13 because the locating part 23 along with the slide part 22 can slide forward and backward with respect to the front shell 13. Furthermore, the supporting part 21 together with the slide part 22 and the locating part 23 can move upward and downward with respect to the front shell 13 by virtue of the elastic part 24, so that makes the supporting device 100 capable of holding different height of external products thereon. So the supporting device 100 in this invention can satisfy the various demands of customers.

The foregoing description of the present invention has been presented for the purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A supporting device, comprising:
   a holding module including a rear shell and a front shell covered on the rear shell, a bottom end of the rear shell extending to form a bottom positioning shell projecting in front of the rear shell, a bottom end of the front shell extending to form a top positioning shell projecting in front of the front shell, the top positioning shell and the bottom positioning shell being matched with and covered with each other to define a receiving chamber therebetween; and
   a locating module movably disposed in the receiving chamber of the holding module, the locating module including a supporting part, a slide part mounted on the supporting part and capable of sliding forward and backward with respect to the supporting part, a locating part fixed on the slide part and projecting upward out of the top positioning shell, and an elastic part elastically clamped between the supporting part and the bottom positioning shell;
   wherein the locating part is apart located in front of the front shell, a distance between the locating part and the front shell can be adjusted by the locating part along with the slide part sliding forward and backward with respect to the front shell, the supporting part together with the slide part and the locating part can move upward and downward with respect to the front shell by virtue of the elastic part.

2. The supporting device as claimed in claim 1, wherein the supporting part has a base body, a receiving cavity is opened in the base body and has a front end and a top end open freely, two opposite inner sidewalls of the receiving cavity are oppositely concaved inward to form a pair of slide slots each extending along a front-to-rear direction and penetrating through a front face of the base body, the slide part has a locating body and a slide board protruding sideward and extending rearward from two opposite side faces of a lower portion of the locating body, the lower portion of the locating body is disposed in the receiving cavity and the slide board is slidably positioned in the slide slots to guide the slide part to slide forward and rearward, an upper portion of the locating body projects out of the receiving cavity, the locating part is vertically fixed in the locating body of the slide part.

3. The supporting device as claimed in claim 2, wherein the bottom positioning shell has a rear plate extending downward from a bottom edge of the rear shell, a bottom plate bent and extending forward from a bottom edge of the rear plate, and two side plates extending forward from two opposite side edges of the rear plate, a through hole is vertically opened in the bottom plate, a top face of the bottom plate is concaved downward to form a ring-shaped positioning groove coaxial around and communicated with the through hole, a bottom face of the base body of the supporting part protrudes downward to form a pillar vertically movably inserted in the through hole, the elastic part is sleeved round the pillar with one end thereof abutting against the bottom face of the base body and the other end thereof being positioned in the positioning groove.

4. The supporting device as claimed in claim 3, wherein the top positioning shell has a top plate extending forward from a bottom edge of the front shell, a front plate extending downward from a front edge of the top plate, and two lateral plates extending downward from two opposite side edges of the top plate and connected with two opposite side edges of the front plate and the bottom edge of the front shell, a through aperture is vertically opened in the top plate through which the locating part movably passes.

5. The supporting device as claimed in claim 4, wherein an inner side of the front plate protrudes rearward to form a plurality of vertical blocking ribs, the base body of the supporting part has a rear face thereof abutting against front edges of the side plates of the bottom positioning shell and the front face thereof abutting against the blocking ribs of the top positioning shell.

6. The supporting device as claimed in claim 3, wherein the elastic part is a spring.

\* \* \* \* \*